US012397309B2

(12) United States Patent
Haist et al.

(10) Patent No.: US 12,397,309 B2
(45) Date of Patent: Aug. 26, 2025

(54) TREATMENT PLANT AND METHOD FOR TREATING WORKPIECES

(71) Applicant: Dürr Systems AG, Bietigheim-Bissingen (DE)

(72) Inventors: Christoph Haist, Ludwigsburg (DE); Corinna Maier, Schwieberdingen (DE); Dietmar Wieland, Waiblingen (DE); Sören Wehler, Bönnigheim (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 153 days.

(21) Appl. No.: 18/255,333

(22) PCT Filed: Dec. 3, 2021

(86) PCT No.: PCT/DE2021/100968
§ 371 (c)(1),
(2) Date: May 31, 2023

(87) PCT Pub. No.: WO2022/135629
PCT Pub. Date: Jun. 30, 2022

(65) Prior Publication Data
US 2024/0024906 A1  Jan. 25, 2024

(30) Foreign Application Priority Data
Dec. 21, 2020 (DE) ............. 10 2020 216 425.8

(51) Int. Cl.
*B05B 13/02* (2006.01)
*B05B 13/04* (2006.01)
(Continued)

(52) U.S. Cl.
CPC ...... *B05B 13/0221* (2013.01); *B05B 13/0452* (2013.01); *B65G 47/5104* (2013.01); *B65G 47/5113* (2013.01); *B05C 13/00* (2013.01)

(58) Field of Classification Search
CPC . B05B 13/0221; B05B 13/0452; B05B 13/00; B65G 47/5113; B65G 47/5104
(Continued)

(56) References Cited

U.S. PATENT DOCUMENTS 2,640,607 A * 6/1953 De Burgh ............ B65G 17/002
  198/465.2
3,809,208 A * 5/1974 Shields ................. B65G 35/00
  198/465.2
(Continued)

FOREIGN PATENT DOCUMENTS

DE        10232402 A1    2/2004
DE        10259594 B3    4/2004
(Continued)

OTHER PUBLICATIONS

International Searching Authority, "International Search Report and Written Opinion," issued in connection with International Application No. PCT/DE2021/100968, Feb. 23, 2022, 14 pages, with English translation of the International Search Report.

*Primary Examiner* — James R Bidwell
(74) *Attorney, Agent, or Firm* — Hanley, Flight & Zimmerman, LLC

(57) ABSTRACT

In order to provide a workpiece treatment plant that has a simple design and can be used flexibly, the treatment plant comprises multiple treatment zones, each of which includes one or more treatment stations for carrying out one or more treatment steps each, and one or more temporary storage units for temporarily storing the workpieces between two treatment steps.

17 Claims, 4 Drawing Sheets

(51) Int. Cl.
   *B05C 13/00*     (2006.01)
   *B65G 47/51*     (2006.01)
(58) Field of Classification Search
   USPC .......................................... 198/347.1, 347.2
   See application file for complete search history.

(56)              References Cited

U.S. PATENT DOCUMENTS

2011/0165833  A1     7/2011  Schaefer
  2019/0152634  A1*    5/2019  Almogy ................ B65B 43/54

FOREIGN PATENT DOCUMENTS

DE      102007034024  A1     1/2009
  DE      102019204612  A1    10/2020
  EP           2303467  B1     5/2016
  EP           3508281  A1     7/2019
  EP           3354352  B1    10/2019

* cited by examiner

TREATMENT PLANT AND METHOD FOR TREATING WORKPIECES

RELATED APPLICATION

This application is a national phase of international application No. PCT/DE2021/100968 filed on Dec. 3, 2021, and claims the benefit of German application No. 10 2020 216 425.8 filed on Dec. 21, 2020, which are incorporated herein by reference in their entirety and for all purposes.

FIELD OF DISCLOSURE AND BACKGROUND

The present disclosure relates to a workpiece treatment plant—in particular, a coating plant for coating vehicle bodies.

SUMMARY

The object of examples disclosed herein is to provide a treatment plant which has a simple design and enables efficient and flexible use thereof for treating workpieces.

According to examples disclosed herein, this object is achieved by the features of the independent device claim.

The workpiece treatment plant—in particular, for coating vehicle bodies—preferably comprises multiple treatment zones which each have one or more treatment stations for carrying out in each case one or more treatment steps.

Furthermore, the treatment plant preferably comprises one or more temporary storage units for temporarily storing the workpieces between the two treatment steps.

The temporary storage unit is in particular a high-bay storage facility.

A treatment, or a treatment of workpieces, is to be understood in particular to mean carrying out preparatory or follow-up measures on the workpieces, coating the workpieces, reworking the workpieces, drying the workpieces or a coating applied thereon, curing a coating arranged on the workpieces, and/or checking the workpieces.

The treatment can take place in particular manually or automatically, and in particular by means of robots.

In conventional treatment plants, temporary storage units are arranged, for example, in a peripheral region of the treatment plant. In contrast, it can be advantageous if the one or more temporary storage units are arranged between two treatment zones.

In particular, it can be provided that, in relation to a horizontal direction and/or in relation to a vertical direction, the one or more temporary storage units be arranged between two treatment zones.

Furthermore, it can be provided that the one or more temporary storage units be bounded on three or four sides by treatment zones—in particular, in relation to a horizontal plane.

It can be advantageous if the one or more temporary storage units on one, two, or more than two levels of the treatment plant—in particular, treatment levels of the treatment plant—are bounded on three sides or four sides by treatment zones.

The workpieces can preferably be fed to the one or more temporary storage units on one or more sides, and in particular on opposite sides of the one or more temporary storage units.

Alternatively or additionally, it can be provided that the workpieces be able to be retrieved from the one or more temporary storage units on one or more sides, and in particular on mutually opposite sides, of the one or more temporary storage units.

It can be advantageous if the treatment plant comprises multiple treatment levels arranged at different elevations—in particular, one above the other—on which the treatment stations of the treatment zones are arranged.

The one or more temporary storage units connect several of the treatment levels to one another preferably in such a way that workpieces on one of the treatment levels can be stored in the one or more temporary storage units and can be retrieved from the one or more temporary storage units on another of the treatment levels.

The one or more temporary storage units thus preferably connect multiple treatment zones to one another—in particular, those treatment zones which are arranged on different treatment levels of the treatment plant.

It can be advantageous if the one or more temporary storage units have in each case several storage admission access points and/or several retrieval access points.

A storage admission access point serves in particular for storing one or more workpieces.

A retrieval access point is used in particular for taking one or more workpieces out of storage.

In general, the storage admission access points and the retrieval access points are referred to below as storage access points.

It can be provided that two or more of the storage admission access points be arranged on different treatment levels of the treatment plant.

Alternatively or in addition thereto, it can be provided that two or more of the retrieval access points be arranged on different treatment levels of the treatment plant.

Furthermore, it can be provided that one or more, and in particular all, storage admission access points be arranged on the same treatment level and/or at the same elevation in the treatment plant.

Furthermore, alternatively or additionally, it can be provided that one or more, and in particular all, retrieval access points be arranged on the same treatment level—in particular, at the same elevation.

It can be provided that the treatment plant comprise multiple treatment levels arranged at different elevations—in particular, one above the other—on which the treatment stations of the treatment zones are arranged, wherein one or more storage admission access points of the one or more temporary storage units and/or one or more retrieval access points of the one or more temporary storage units are in each case arranged on one or more of the treatment levels. As a result, in particular, a very flexible use of the one or more temporary storage units can be achieved, since the workpieces can preferably be selectively stored in the temporary storage unit at different elevations and be retrieved from the one or more temporary storage units at one or more different elevations or at the same elevation.

It can be advantageous if the one or more temporary storage units each comprise a storage conveyor system for conveying the workpieces within the respective temporary storage unit.

By means of the storage conveyor system, the workpieces can preferably be brought from one or more storage admission access points to one or more retrieval access points, and in particular even back to the storage admission access point at which the workpiece to be retrieved was stored.

A storage admission access point can, optionally, be used exclusively for admission into storage.

Furthermore, a retrieval state can optionally serve exclusively for retrieval.

Preferably, however, all storage access points of the one or more temporary storage units are not only storage admission access points but also retrieval access points.

One or more storage access points—in particular, storage admission access points and/or retrieval access points—of the temporary storage unit preferably form a transfer station, on which the workpieces from a zone conveyor system of the treatment plant can be transferred to the storage conveyor system and/or from the storage conveyor system to the zone conveyor system.

In particular, the transfer station preferably serves to transfer the workpieces from a conveyor system according to a first type of conveyor system to a conveyor system of a second type of conveyor system different therefrom—for example, from a skid conveyor and/or a roller conveyor to a rail conveyor or to an AGV conveyor system. Alternatively or additionally, it can be provided that the transfer station be used for a transfer of the workpieces from a rail conveyor or an AGV conveyor system to a skid conveyor and/or roller conveyor.

It can be advantageous if the workpieces are receivable by means of workpiece holders on the storage conveyor system.

Depending upon a type of adjacent zone conveyor system, the workpiece holders can preferably be transferred selectively from the storage conveyor system to the zone conveyor system or can be stored within the respective temporary storage unit. The workpiece holders can thus remain in particular within the respective temporary storage unit or can be stored and retrieved together with the workpieces.

For example, it can be provided that so-called skids or ski bars or crossbars be provided as workpiece holders. These can serve, for example, for receiving the workpieces within the one or more temporary storage units and remain, for example, within the one or more temporary storage units when the zone conveyor system to which the workpieces are transferred does not require such workpiece holders. Alternatively, in such a case, a removal of workpiece holders that are not required can take place in another way.

Furthermore, it can be provided that the workpieces, without workpiece holders, be receivable, and in particular can be stored or retrieved, within the one or more temporary storage units. Workpieces which are possibly conveyed to a storage admission access point by means of such workpiece holders are then in particular separated from the workpiece holders at a transfer station and are stored in the one or more temporary storage units without the respective workpiece holder. The workpiece holder remaining at the transfer station is then transported away in particular by means of the zone conveyor system or an additional conveyor system.

It can be advantageous if the storage conveyor system, as an alternative or in addition to a workpiece conveyance, serves for the conveyance—in particular, the return conveyance—of workpiece holders—in particular, skids—which are not carrying workpieces. The one or more temporary storage units can be used in particular as skid collectors and/or skid distributors—in particular, in order to enable the workpiece holders to be returned for use with new workpieces.

One or more of the temporary storage units preferably serve for temporarily storing workpieces with different treatment progress states.

The one or more temporary storage units can preferably be variably populated with workpieces; in particular, the workpieces are preferably not able to be stored at prespecified positions and/or along prespecified conveying paths in the one or more temporary storage units, or be conveyable through them.

It is preferably provided that the workpieces be able to be fed to one or more treatment stations and/or treatment zones of the one or more temporary storage units as required—in particular, depending upon capacity utilization states and/or processing sequences.

In particular, workpieces in different treatment progress states can be stored in the same temporary storage unit or the same temporary storage units.

It can be advantageous if one or more of the temporary storage units each have several storage admission access points, at which workpieces in different treatment progress states can be stored in the temporary storage unit.

Furthermore, it can be provided that the one or more temporary storage units each have several retrieval access points, at which workpieces in different treatment progress states can be retrieved from the respective temporary storage unit.

The one or more temporary storage units are preferably designed as sorting buffers or serve as sorting buffers.

It is preferably provided that the one or more temporary storage units between several treatment stations and/or treatment zones be used for the temporary storage and/or sorting of the workpieces.

The treatment plant preferably comprises several temporary storage units, wherein workpieces with the same treatment progress state can selectively be stored in one of several of these temporary storage units. Preferably, it is further provided that these several temporary storage units be able to be supplied with workpieces in different treatment progress states, wherein workpieces with different treatment progress states are preferably simultaneously stored in the multiple temporary storage units.

Examples disclosed herein also relate to a method for treating workpieces—in particular, for coating workpieces.

In this regard, the object of examples disclosed herein is to provide a method by means of which workpieces can be treated in a simple and flexible manner.

According to examples disclosed herein, this object is achieved by the independent method claim.

The method for treating workpieces—in particular, for coating vehicle bodies—preferably comprises the following:
  treating the workpieces in several treatment stations;
  temporarily storing the workpieces in one or more temporary storage units between the two treatment steps.

The method according to examples disclosed herein preferably comprises one or more of the features and/or advantages described in connection with the treatment plant.

Furthermore, the treatment plant preferably comprises one or more of the features and/or advantages described in connection with the method.

It can be advantageous if the workpieces are stored several times in the same temporary storage unit—in particular, with different treatment progress states.

It can be advantageous if the workpieces are stored on different treatment levels, on which the treatment stations are arranged, in the one or more temporary storage units and retrieved from the same.

In particular, it can be provided here that the workpieces be stored on one treatment level and that the workpieces be retrieved on a further treatment level—in particular, for feeding to a next treatment step, and in particular in a treatment zone.

It can be advantageous if the workpieces are stored in the one or more temporary storage units in a manner preserving their orientation, conveyed within the one or more temporary storage units in a manner preserving their orientation, and/or retrieved from the one or more temporary storage units in a manner preserving their orientation. In particular, a rotation of the workpieces, which usually requires a high space requirement for suitable rotary devices, can thereby be avoided.

The term, "preserving orientation," is preferably to be understood as meaning that a longitudinal axis of the workpieces remains unchanged during a transfer to the one or more temporary storage units, during conveying within the one or more temporary storage units, and/or during delivery from the one or more temporary storage units.

The orientation of the workpieces, which is preserved here, is preferably a global orientation of the workpieces relative to the orientation of the treatment plant as a whole—in particular, independently of a local conveying direction of a conveyor system.

According to a further aspect of examples disclosed herein, which can be used and/or combined in particular for further optimization of the aforementioned treatment plant and/or of the above-mentioned method, concerns the use of one or more additional levels, which can be provided in addition to one or more treatment levels.

The treatment plant thus comprises in particular several treatment zones, which each have one or more treatment stations for carrying out one or more treatment steps each.

In addition, several treatment levels arranged at different elevations—in particular, one above the other—are preferably provided, on which the treatment stations of the treatment zones are arranged.

In addition, a conveyor system for conveying the workpieces through the treatment zones is preferably provided.

Furthermore, a temporary storage unit for temporarily storing workpieces between the two treatment steps is preferably provided in the treatment plant.

In this case, the workpieces can be stored on different treatment levels in the temporary storage unit and be retrieved from the same. In particular, a level offset for feeding the workpieces to different treatment stations and/or treatment zones can thereby be realized.

In addition, the sequence of the workpieces in which the workpieces can be supplied to the treatment stations is preferably adaptable and/or variable.

The temporary storage unit is in particular a high-bay storage facility.

The temporary storage unit preferably comprises a storage conveyor system, by means of which the workpieces can be conveyed to different storage levels within the temporary storage unit and/or to different levels—in particular, treatment levels—of the treatment plant.

The treatment plant preferably comprises one or more additional levels on which preferably no treatment stations are arranged, or which comprise only those treatment stations which are not accessible from the additional level from outside the treatment zone to which the one or the several treatment stations of the additional level are assigned.

A treatment zone which may be arranged in an additional level is thus preferably not accessible within the treatment level.

It can be advantageous if the temporary storage unit is accessible for storing and/or retrieving workpieces from the at least one additional level of the treatment plant.

The additional level can in particular be an intermediate level between two treatment levels of the treatment plant.

Furthermore, the additional level can also, for example, be a topmost level above all treatment levels of the treatment plant.

The at least one additional level is in particular a storage admission level and/or retrieval level by means of which the temporary storage unit is also accessible for workpieces when the workpieces are, for example, initially treated in a horizontal direction at a distance from the temporary storage unit on a treatment level and cannot easily be transported within this treatment level to the temporary storage unit. In addition, such an additional level can make a larger number of storage admission access points and/or retrieval access points possible—in particular, in addition to one or more storage admission access points and/or to one or more retrieval access points on one or more of the treatment levels.

It can be advantageous if the treatment plant comprises one or more levels, and in particular additional levels, on which one or more intermediate conveyor systems of the treatment plant are arranged.

The one or more intermediate conveyor systems preferably serve exclusively for the treatment-free conveying of the workpieces from a vertical conveying device of the treatment plant to the temporary storage unit and/or from the temporary storage unit to the vertical conveying device.

The intermediate conveyor system connects, for example, the temporary storage unit to the vertical conveying device, bypassing all of the treatment stations arranged on the additional level.

The vertical conveying device is preferably a conveying device which is different from the storage conveyor system and/or is spaced apart from the temporary storage unit.

By means of the vertical conveying device, the workpieces can preferably be conveyed without a treatment step being carried out.

Preferably, the workpieces can be conveyed by means of the vertical conveying device from one level—in particular, a treatment level or an additional level—to a further level—in particular, an additional level or treatment level. The levels can in particular be arranged directly one after the other, and in particular directly one above the other. Furthermore, it can be provided that one or more further levels be arranged between these levels.

The intermediate conveyor system preferably has a fixed conveying path, from which no treatment stations, which are optionally arranged on the additional level, are accessible.

The temporary storage unit preferably has one or more storage admission access points and/or retrieval access points arranged on the at least one additional level.

It can be advantageous if the vertical conveying device connects two or more than two levels of the treatment plant to one another for conveying the workpieces from one of the levels to one or more further levels. The vertical conveying device preferably connects only one or more of the treatment levels of the treatment plant to only one or more of the additional levels.

In particular, it can be provided that the vertical conveying device connect only two transfer stations to one another, wherein a transfer station is arranged on one treatment level, and a further transfer station is arranged on an additional level.

For example, it can be provided that the vertical conveying device connect an AGV conveyor system of the treatment plant on one of the treatment levels of the treatment plant at one end to the intermediate conveyor system at the other end.

An AGV conveyor system is in particular a conveyor system in which the workpieces are conveyed on self-driven, driverless, transport vehicles, i.e., so-called automated guided vehicles (AGV's).

The intermediate conveyor system is in particular a skid conveyor, a roller conveyor and/or a transverse conveyor, or a rail conveyor.

One AGV conveyor system of the treatment plant is in particular arranged and/or formed at a zero level—in particular, a floor of a building surrounding the treatment plant.

Above the zero level, the conveyor system of the treatment plant preferably comprises exclusively other types of conveyor systems.

For example, it is provided that the intermediate conveyor system be a roller conveyor or comprise a roller conveyor.

In particular, when several storage admission access points and/or several retrieval access points are arranged on the additional level, it can be provided that the intermediate conveyor system comprise one or more transverse conveyors—in particular, in order to connect the storage admission access points and/or the retrieval access points to a conveyor of the intermediate conveyor system—which conveyor is designed, for example, as a roller conveyor.

It can be advantageous if the treatment plant comprises one or more transfer stations, by means of which the workpieces can be transferred to the intermediate conveyor system or can be discharged from the intermediate conveyor system—in particular, without the transfer of workpiece holders, e.g., skids, for holding the workpieces.

The treatment plant described is suitable in particular for carrying out a method for treating workpieces.

According to the above-mentioned aspect of examples disclosed herein, such a method comprises in particular:

carrying out treatment steps on the workpieces in treatment stations of a treatment plant; and
conveying the workpieces to different treatment levels on which the treatment stations are arranged; and
temporarily storing the workpieces in a temporary storage unit between the two treatment steps.

The workpieces are preferably stored on different treatment levels in the temporary storage unit and retrieved from the same. In particular, storage in one treatment level and retrieval in a further treatment level can be provided.

The workpieces can preferably be stored in the temporary storage unit on several treatment levels and/or can be retrieved from the temporary storage unit on several treatment levels.

After a treatment step has been carried out on one of the treatment levels, the workpieces are preferably conveyed to a further treatment level or to an additional level and there stored in the temporary storage unit—in particular, without a treatment step being carried out on this further treatment level or this additional level.

It can be advantageous if the workpieces are retrieved from the temporary storage unit for the purpose of carrying out a treatment step on one level—in particular, treatment level or additional level—wherein the workpieces are then preferably conveyed to a different level—in particular, treatment level—for carrying out the treatment step, preferably without carrying out a treatment step on that level—in particular, treatment level or additional level—on which the retrieval of the workpieces from the temporary storage unit takes place.

The conveying of the workpieces that is independent of the temporary storage unit from one level to another level takes place in particular by means of a vertical conveying device—for example, by means of an additional lifter.

By means of an intermediate conveyor system and a vertical conveying device, a conveying connection, for example, is established or can be established in order to retrieve workpieces from the temporary storage unit, bring them horizontally to a position of the additional level that is spaced apart from the temporary storage unit, and finally to transfer them to a zone conveyor system on another level—in particular, treatment level. This zone conveyor system is in particular an AGV conveyor system. The associated treatment zone is, in particular, a treatment zone in which treatment boxes that can be individually approached and/or individually fitted are provided—for example, for carrying out preparatory or follow-up measures and/or coating steps and/or sealing steps.

As preparatory measures, for example, plugs can be fitted, operating aids can be fitted and/or dismantled, masks can be attached and/or removed, and/or reworking can be carried out on the workpiece—in particular, on a body shell.

As follow-up measures, operating aids can be fitted and/or dismantled, and masking can be attached and/or removed, and/or a coating post-processed.

Operating aids are, in particular, body part holders, preferably tools that hold doors open, tools that hold the hood open, etc.

Masks are in particular local covers for protecting correctly treated workpiece areas during the post-processing of flaws on the workpieces.

It can be provided that, by means of an intermediate conveyor system and a vertical conveying device—in particular, a further intermediate conveyor system and a further vertical conveying device—a conveying connection, for example, be established or be able to be established in order to transport workpieces discharged from a dryer of the treatment plant to another level—in particular, treatment level or additional level—horizontally in this treatment level or additional level towards the temporary storage unit and to store them in the temporary storage unit. A zone conveyor system for conveying the workpieces in the dryer is in particular a roller conveyor or suspension chain conveyor. The intermediate conveyor system is in particular a roller conveyor or suspension chain conveyor.

Further preferred features and/or advantages of examples disclosed herein are the subject of the following description and the drawings illustrating an exemplary embodiment.

Figure 1:
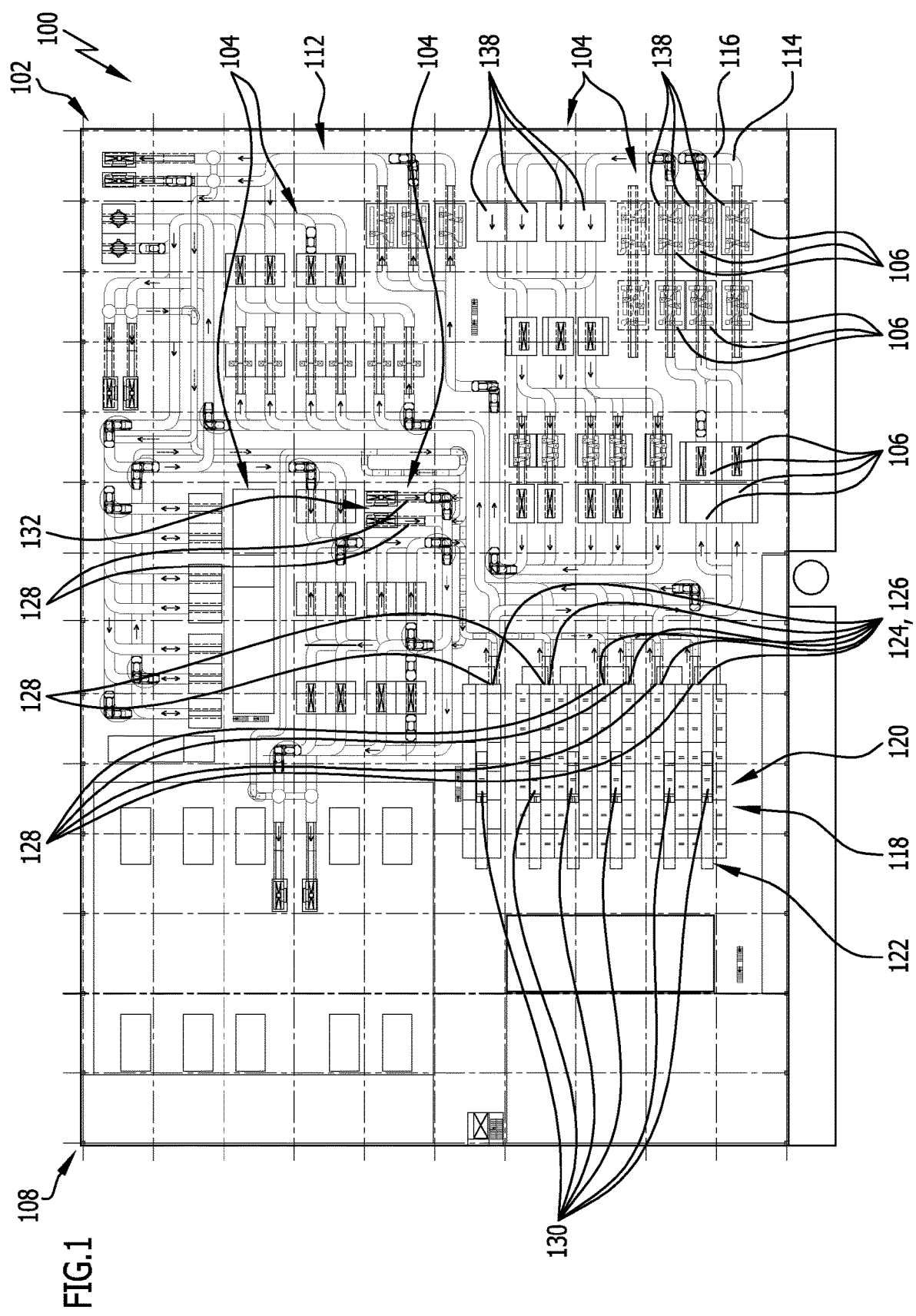
FIG. 1 shows a first treatment level of a treatment plant for treating workpieces.

The same or functionally equivalent elements are provided with the same reference signs in all figures.

DETAILED DESCRIPTION OF THE DRAWINGS

An embodiment, shown in FIGS. 1 through 4, of a treatment plant designated as a whole by 100 is used for the treatment of workpieces—in particular, the painting of vehicle bodies.

The treatment plant 100 is thus in particular a paint shop.

The treatment plant 100 comprises several levels 102 which serve for accommodating the components of the treatment plant 100—in particular, for accommodating treatment zones 104—which in each case comprise one or more treatment stations 106.

In the embodiment shown in FIGS. 1 through 4, two levels 102 are designed as treatment levels 108.

Most or all of the treatment stations 106 are arranged on these treatment levels 108.

In addition, two levels 102 of the treatment plant 100, which are designed as additional levels 110, are provided.

The workpieces to be treated are conveyed by means of a conveyor system 112 of the treatment plant 100 through the levels 102 and between the levels.

For this purpose, the conveyor system 112 comprises various conveyor system sections.

Each conveyor system section serves here for a particular conveying purpose and/or is designed as a special type of conveyor system.

For example, a zone conveyor system 114 is assigned to each treatment zone 104.

In the first treatment level 108, shown in FIG. 1, the workpieces are conveyed, for example, by means of an AGV conveyor system 116, in which the workpieces are transported by means of freely-driven, and in particular autonomously driven, transfer vehicles.

In this case, the AGV conveyor system 116 can be provided in a single treatment zone 104 or even across treatment zones.

In the embodiment shown in FIG. 1, it is provided that the AGV conveyor system 116 serve to convey the workpieces in several treatment zones 104.

As can also be seen from FIG. 1, the treatment plant 100 comprises a temporary storage unit 118, which is designed in particular as a high-bay storage facility 120.

The temporary storage unit 118 comprises a storage conveyor system 122, by means of which workpieces can be conveyed from and to storage locations within the temporary storage unit 118.

In addition, the storage conveyor system 122 serves for receiving workpieces at storage admission access points 124 of the temporary storage unit 118 and/or for the delivery of workpieces at retrieval access points 126 of the temporary storage unit 118.

In particular, transfer stations 128 of the treatment plant 100 are provided in the transfer area—for example, at the storage admission access points 124 and/or the retrieval access points 126.

The transfer stations 128 in particular enable a transfer of the workpieces from a conveyor system of a first type of conveyor system to a conveyor system of the same type of conveyor system or of a further type of conveyor system.

As can also be seen from FIG. 1, the temporary storage unit 118 comprises, for example, several sections or zones which are or can be connected to one another by means of connection points 130.

The temporary storage unit 118 thus makes possible in particular an exchange or a transfer of workpieces within various zones or sections of the temporary storage unit 118.

As a result, the workpieces in storage can be transported in a particularly flexible manner to different retrieval access points 126.

The temporary storage unit 118 is preferably used for transferring the workpieces to other levels 102 of the treatment plant 100.

By means of the storage conveyor system 122, workpieces treated for example in the second treatment level 108 (see FIG. 3), which are fed into this second treatment level 108 of the temporary storage unit 118, can be conveyed to the first treatment level 108 (see FIG. 1) in order to continue the treatment of the workpieces in the first treatment level 108.

Figure 3:
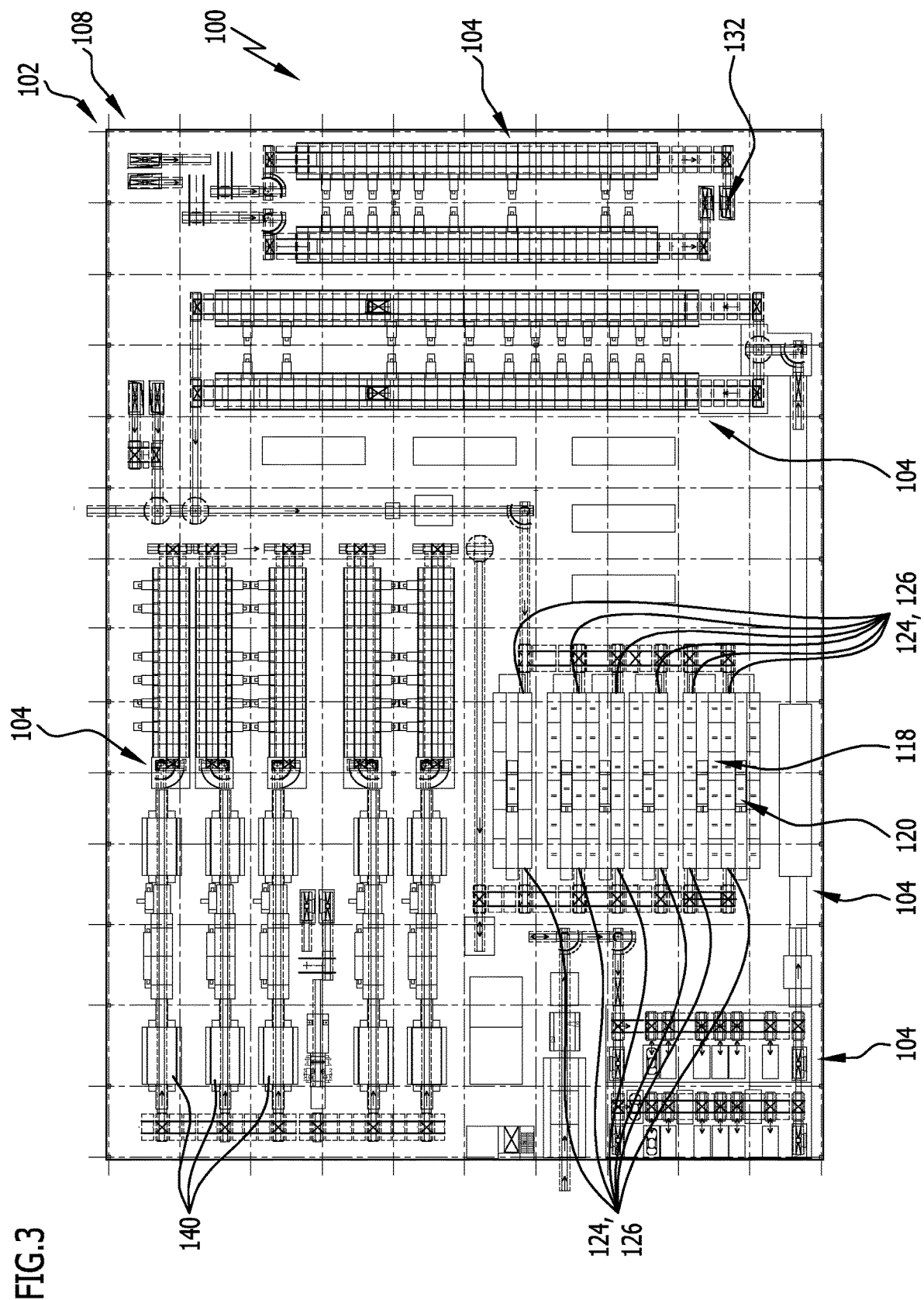
FIG. 3 shows a second treatment level of the treatment plant.

As can be seen in particular from FIG. 3, the treatment zones 104 are arranged around the temporary storage unit 118.

In particular, the temporary storage unit 118 is preferably arranged between two treatment zones 104, at least in relation to a horizontal direction and relative to at least one of the levels 102.

As a result, the temporary storage unit 118 can be integrated particularly easily into the treatment plant 100 and is easily and flexibly accessible at several locations in order to be able to store the workpieces in the temporary storage unit 118 as required and retrieve them from the same.

As can be seen in particular in FIGS. 1 and 3, which represent the two treatment levels 108, several storage admission access points 124 and/or retrieval access points 126 are provided on each treatment level 108. The number of these storage admission access points 124, 126, together with the design of the storage conveyor system 122, is decisive for the storage capacity, retrieval capacity, speed of storage, and/or speed of retrieval of the temporary storage unit 118.

Depending upon the configuration and arrangement of the treatment zones 104, the number of storage access points 124, 126 present on a level 102 may not be sufficient.

For this reason, one or more additional levels 110 can preferably be used, to provide further storage access points 124, 126 for access to the temporary storage unit 118.

Figure 2:
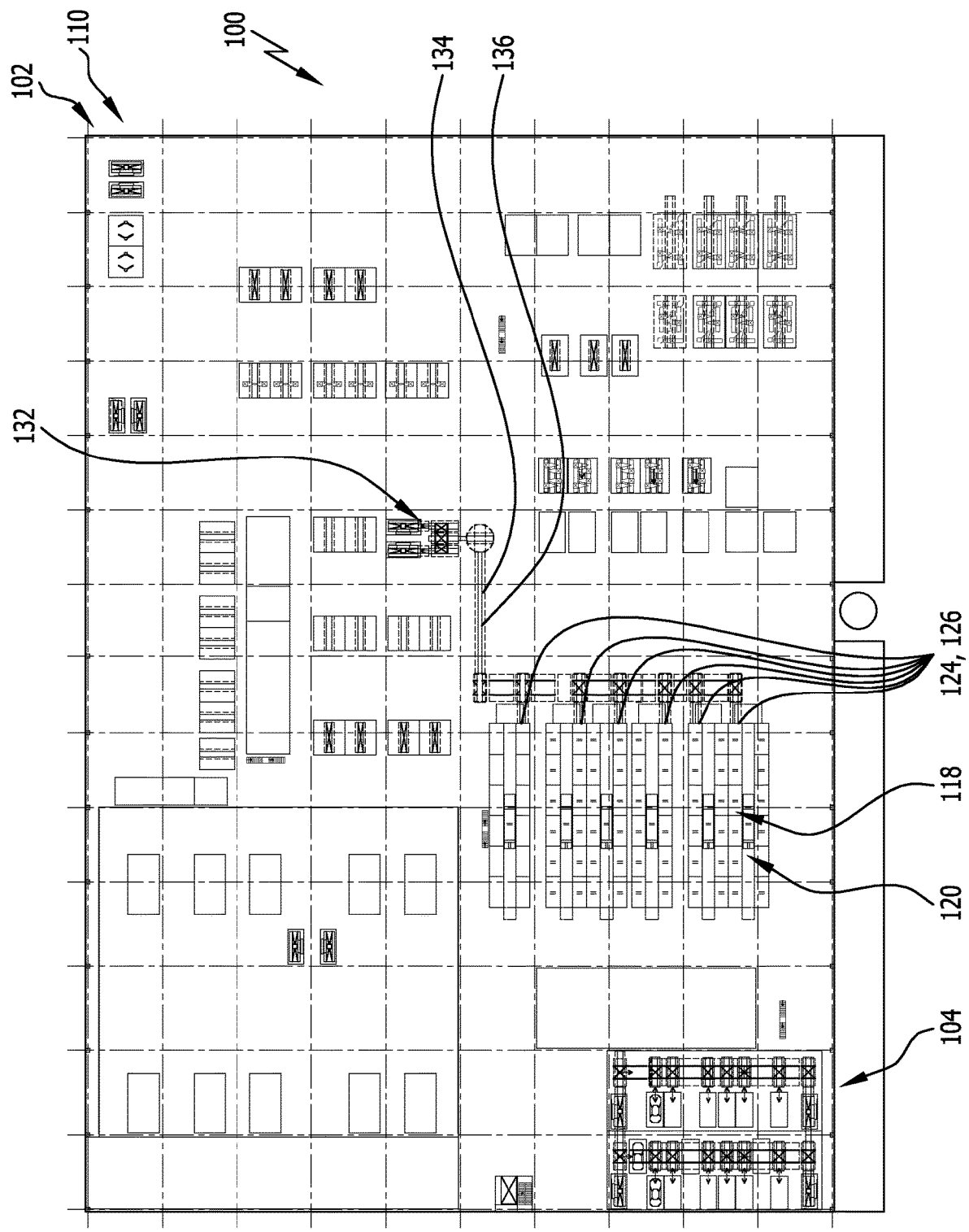
FIG. 2 shows a first additional level of the treatment plant.
Figure 4:
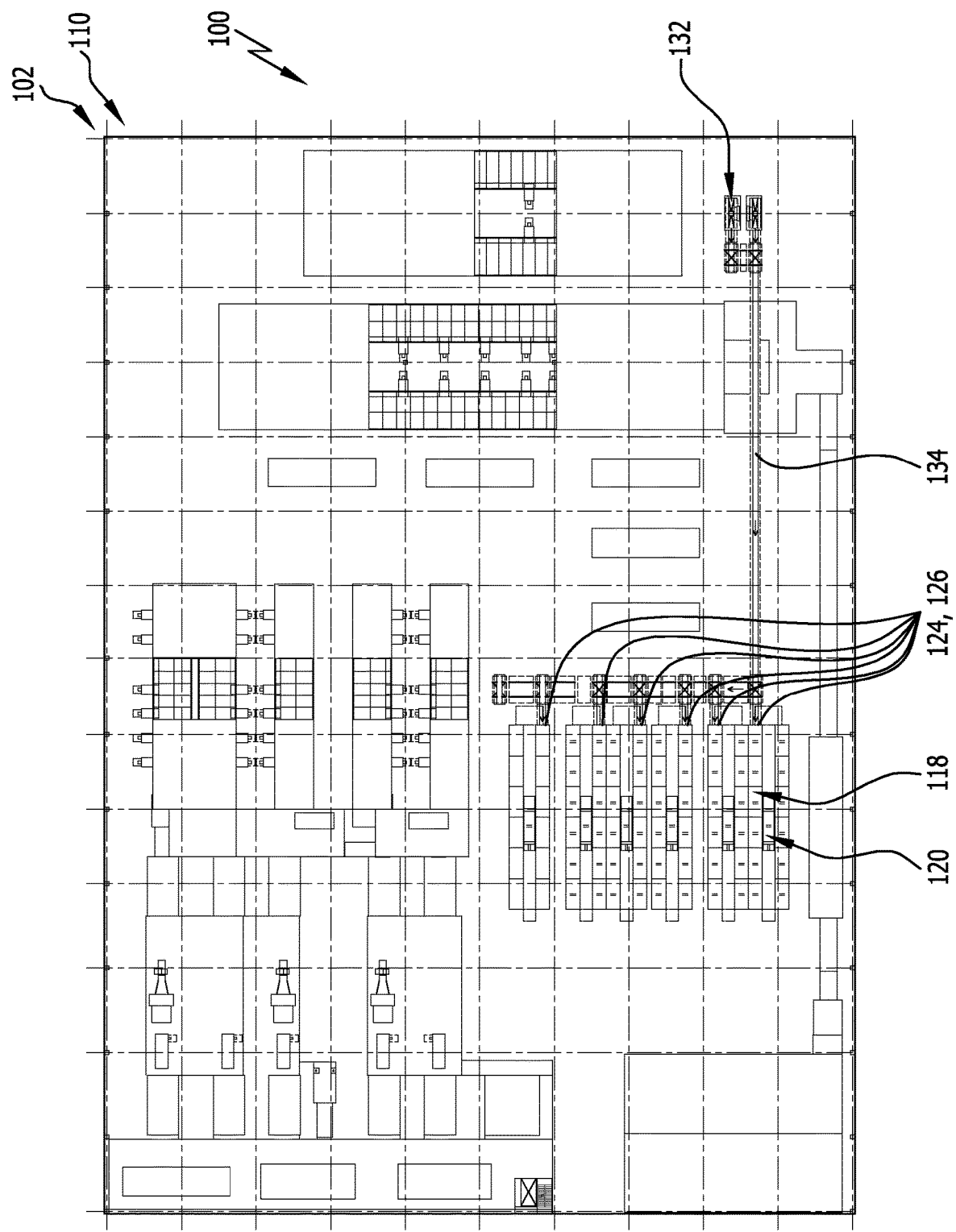
FIG. 4 shows a second additional level of the treatment plant.

As can be seen in particular from the two additional levels 110 in FIGS. 2 and 4, for this purpose, the treatment plant 100 comprises one or more vertical conveying devices 132, which connect two or more levels 102 to one another.

It is thus provided that the vertical conveying device 132 on the first additional level 110 (see FIG. 2) connect this additional level 110 to the first treatment level 108 (see FIG. 1).

By means of this vertical conveying device 132, in particular several, e.g., six, retrieval access points 126 on the first additional level 110 are connected to one or more, e.g., two, transfer stations 128 on the first treatment level 108.

The number of workpieces that can be retrieved from the temporary storage unit 118 within a predetermined time interval and which can be supplied to the first treatment level 108 can thus be significantly increased—for example, doubled.

The vertical conveying device 132 does not have to be arranged directly adjacent to the temporary storage unit 118.

Rather, it can be provided that the vertical conveying device 132 be arranged at a distance from the temporary storage unit 118 and connected to the same by means of an intermediate conveyor system 134.

The intermediate conveyor system 134 is, for example, a roller conveyor 136, which, by means of several transverse conveyors and/or turntables, connects the vertical conveying device 132 to the retrieval access points 126 on the first additional level 110.

It can be provided that the workpieces to be fed to the first treatment level 108 all be fed to the same treatment zone 104.

In the embodiment shown in FIGS. 1 through 4, however, it is provided that the workpieces discharged from the retrieval access points 126 on the first treatment level 108, on the one hand, and the workpieces from the first additional level 110 which are fed via the vertical conveying device 132 to the first treatment level 108, on the other, be fed to different treatment zones 104.

As can be seen in particular from FIGS. 3 and 4, a further vertical conveying device 132 can be provided which, for example, serves to transfer the workpieces from a treatment zone 104 on the second treatment level 108 to an intermediate conveyor system 134 on the second additional level 110.

By means of this intermediate conveyor system 134 on the second additional level 110, the workpieces can then be conveyed by the vertical conveying device 132 to the storage admission access points 124 of the temporary storage unit 128 that are arranged on this second additional level 110, and finally can be stored in the temporary storage unit 118.

By means of the two vertical conveying devices 132 mentioned above, the workpieces can thus be transported in particular from one of the levels 102 to an adjacent level 102.

In addition, further vertical conveying devices 132, not discussed here, can be provided in order to transport the workpieces in particular from one of the treatment levels 108 to another of the treatment levels 108.

The above-described design of the conveyor system 112 together with the temporary storage unit 118 enables in particular a concentration of treatment stations 106, formed as treatment boxes 138, on the first treatment level 108, as well as the concentration of treatment lines 140 on the second treatment level 108. As a result of optimized storage and retrieval of the workpieces in the temporary storage unit 118, simple transport between the levels 102, simple sorting of the workpieces for feeding to the individual treatment stations 106, and, in addition, a flexible adaptation to different treatment variants are possible.

Further flexibility is attained by the arrangement of the temporary storage unit 118 within the treatment plant 100 and also by the use of one or more additional levels 110 for storing workpieces in the temporary storage unit 118 or retrieving workpieces from the temporary storage unit 118.

LIST OF REFERENCE NUMERALS

100 Treatment plant
102 Level
104 Treatment zone
106 Treatment station
108 Treatment level
110 Additional level
112 Conveyor system
114 Zone conveyor system
116 AGV conveyor system
118 Temporary storage unit
120 High-bay storage facility
122 Storage conveyor system
124 Storage admission access point
126 Retrieval access point
128 Transfer station
130 Connection point
132 Vertical conveying device
134 Intermediate conveyor system
136 Roller conveyor
138 Treatment box
140 Treatment line

The invention claimed is:

1. Treatment plant for treating workpieces, in particular for coating vehicle bodies, the treatment plant comprising: treatment zones, each of which has one or more treatment stations for carrying out one or more treatment steps; and one or more temporary storage units for temporarily storing the workpieces between two of the one or more treatment steps, wherein one or more storage access points, in particular storage admission access points and/or retrieval access points, of the temporary storage unit form or include or adjoin one or more transfer stations, and wherein, at the one or more transfer stations, the workpieces can be transferred from a conveyor system according to a first type of conveyor system to a conveyor system of a second type of conveyor system different therefrom.

2. Treatment plant according to claim 1, wherein the one or more temporary storage units are arranged between two treatment zones.

3. Treatment plant according to claim 1, wherein the treatment plant includes treatment levels arranged at different elevations, in particular one above the other, on which the treatment stations of the treatment zones are arranged, wherein the one or more temporary storage units connect of the treatment levels to one another such that workpieces on one of the treatment levels can be stored in the one or more temporary storage units and on another of the treatment levels can be retrieved from the one or more temporary storage units.

4. Treatment plant according to claim 1, wherein the one or more temporary storage units in each case have storage admission access points and/or retrieval access points.

5. Treatment plant according to claim 4, wherein two or more of the storage admission access points are arranged on different treatment levels of the treatment plant and/or wherein two or more of the retrieval access points are arranged on different treatment levels of the treatment plant.

6. Treatment plant according to claim 1, wherein the treatment plant includes treatment levels arranged at different elevations, in particular one above the other, on which the treatment stations of the treatment zones are arranged, wherein in each case one or more storage admission access points of the one or more temporary storage units and/or one or more retrieval access points of the one or more temporary storage units are arranged on one or more of the treatment levels.

7. Treatment plant according to claim 1, wherein the one or more temporary storage units in each case include a storage conveyor system for conveying the workpieces within the respective temporary storage unit.

8. Treatment plant according to claim 7, wherein at the one or more transfer stations the workpieces can be transferred from a zone conveyor system of the treatment plant to the storage conveyor system and/or from the storage conveyor system to the zone conveyor system.

9. Treatment plant according to claim 8, wherein the workpieces can be received by means of workpiece holders on the storage conveyor system, and wherein, depending upon a type of adjacent zone conveyor system, the workpiece holders can be transferred selectively from the storage conveyor system to a zone conveyor system or remain within the respective temporary storage unit.

10. Treatment plant according to claim 7, wherein the storage conveyor system serves, alternatively or in addition to a workpiece conveyance, for the conveyance, in particular return conveyance of workpiece holders, in particular skids, which are not carrying workpieces.

11. Treatment plant according to claim 1, wherein one or more of the temporary storage units is used for temporarily storing workpieces in different treatment progress states.

12. Treatment plant according to claim 11, wherein one or more of the temporary storage units have in each case storage admission access points, at which workpieces in different treatment progress states can be stored in the temporary storage unit.

13. Treatment plant according to claim 1, wherein the treatment plant includes temporary storage units, wherein workpieces with the same treatment progress state can selectively be stored in one of several of these temporary storage units.

14. Method for treating workpieces, in particular for coating vehicle bodies, the method comprising:
    treating the workpieces in treatment stations; and
    temporarily storing the workpieces in one or more temporary storage units between two treatment steps, wherein one or more storage access points, in particular storage admission access points and/or retrieval access points, of the temporary storage unit form or include or adjoin one or more transfer stations, and wherein at the one or more transfer station the workpieces can be transferred from a conveyor system according to a first type of conveyor system to a conveyor system of a second type of conveyor system different therefrom.

15. Method according to claim 14, wherein the workpieces, in particular with different treatment progress states, are stored in the same temporary storage unit.

16. Method according to claim 14, wherein the workpieces are stored on different treatment levels, on which the treatment stations are arranged, in the one or more temporary storage units and retrieved from the same.

17. Method according to claim 14, wherein the workpieces are stored in the one or more temporary storage units in a manner preserving their orientation, conveyed within the one or more temporary storage units in a manner preserving their orientation, and/or retrieved from the one or more temporary storage units in a manner preserving their orientation.

* * * * *